(12) United States Patent
Doss (10) Patent No.: US 8,051,317 B2
(45) Date of Patent: Nov. 1, 2011

(54) POWER SUPPLY WITH REMOTELY ADJUSTABLE OUTPUT

(75) Inventor: Gary Richard Doss, Tampa, FL (US)

(73) Assignee: Honeywell International, Inc., Morristown, NJ (US)

( * ) Notice: Subject to any disclaimer, the term of this patent is extended or adjusted under 35 U.S.C. 154(b) by 786 days.

(21) Appl. No.: 12/146,780

(22) Filed: Jun. 26, 2008

(65) Prior Publication Data

US 2009/0327783 A1 Dec. 31, 2009

(51) Int. Cl.
*G06F 1/26* (2006.01)
*H02M 1/12* (2006.01)
(52) U.S. Cl. .... 713/340; 713/300; 363/21.1; 363/21.11; 363/21.18; 363/26; 363/41
(58) Field of Classification Search .................. 713/300, 713/340; 363/21.1, 21.11, 21.18, 26, 41
See application file for complete search history.

(56) References Cited

U.S. PATENT DOCUMENTS

| | | | |
|---|---|---|---|
| 5,627,412 A | 5/1997 | Beard | |
| 6,297,977 B1 * | 10/2001 | Huggett et al. | 363/65 |
| 7,148,755 B2 | 12/2006 | Naffziger | |
| 7,157,889 B2 | 1/2007 | Kernahan | |
| 7,315,183 B2 | 1/2008 | Hinterscher | |
| 7,327,149 B2 | 2/2008 | Chapuis | |
| 7,345,894 B2 | 3/2008 | Sawtell | |
| 7,362,647 B2 | 4/2008 | Wu | |
| 7,365,661 B2 | 4/2008 | Thomas | |
| 7,456,620 B2 * | 11/2008 | Maksimovic et al. | 323/283 |
| 7,782,037 B2 * | 8/2010 | Ohtani et al. | 323/284 |
| 2005/0168198 A1 * | 8/2005 | Maksimovic et al. | 323/222 |
| 2006/0113974 A1 * | 6/2006 | Kan et al. | 323/282 |
| 2007/0047272 A1 * | 3/2007 | Kris | 363/41 |
| 2007/0236201 A1 | 10/2007 | Brown | |

FOREIGN PATENT DOCUMENTS

EP 355415 A * 2/1990

* cited by examiner

*Primary Examiner* — Nitin Patel
(74) *Attorney, Agent, or Firm* — Miriam Jackson Esq.

(57) ABSTRACT

A power supply system allowing remote adjustments of the power output of the power supply unit without having to physically access the power supply unit itself is disclosed. A power supply system in accordance with the present invention utilizes a central processing unit (CPU) to provide a command that adjusts to the power output via a modified pulse width modulator (MPWM). Moreover, the central processing unit (CPU) may also be used to provide fine tune adjustments to the error signal of the power supply system, wherein the central processing unit (CPU) produces a command for the modified pulse width modulator to control the power output.

12 Claims, 5 Drawing Sheets

POWER SUPPLY WITH REMOTELY ADJUSTABLE OUTPUT

BACKGROUND OF THE INVENTION

The current invention relates generally to a modified pulse width modulator (MPWM) in a power supply system that allows an operator to modify the output of the power supply without the need to physically access the power supply system itself. More particularly, the present invention relates to an innovative modified pulse width modulator (MPWM) connected to a power supply system utilizing a central processing unit (CPU) to control the inputs to get the desired output out of a power supply system.

Traditional power supply units are of analog in nature, utilizing an analog pulse width modulator (APWM) to control the frequency and duty cycle for an output voltage. A traditional analog power supply is shown in FIG. 1, depicting the components and operations of an analog power supply.

Figure 1:
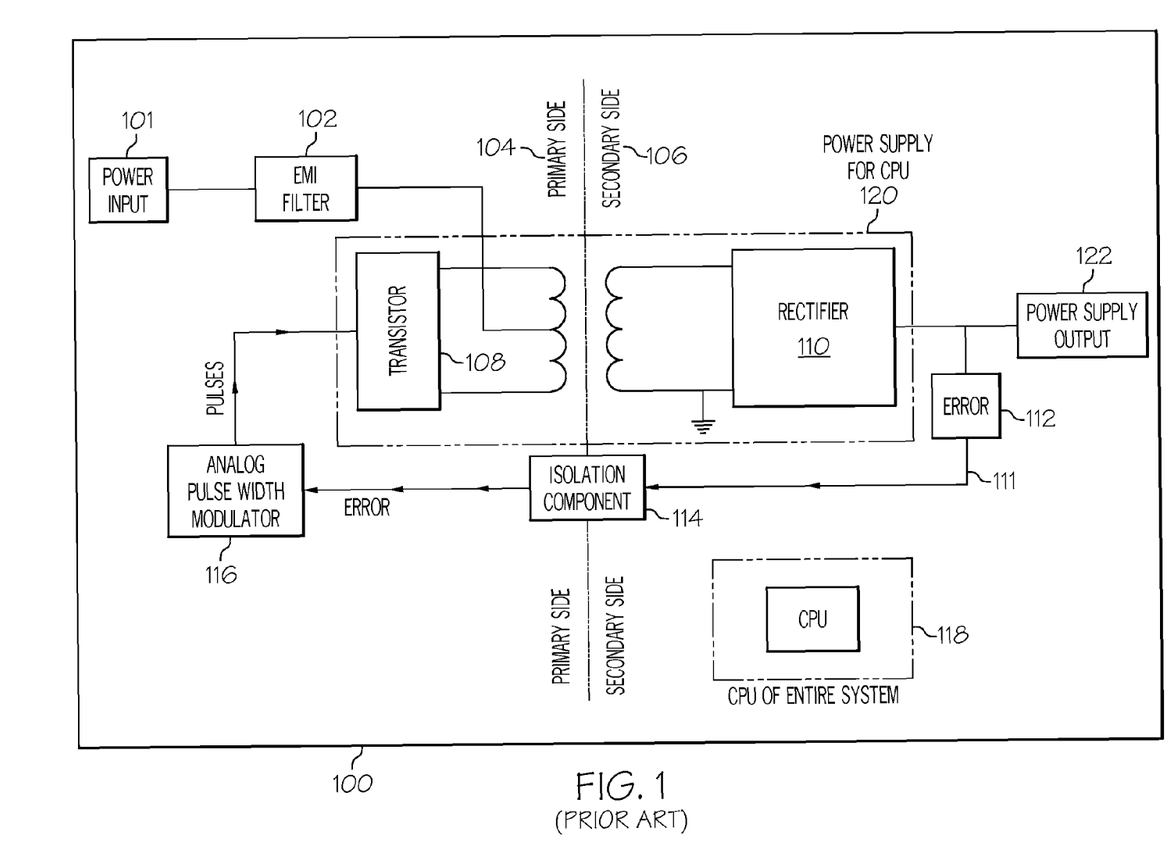
FIG. 1 shows a prior art analog power supply system.

FIG. 1 shows the various components of a traditional analog power supply system 100 containing a power input 101, an electromagnetic interference (EMI) filter 102, and a transistor 108, all located on the primary side 104 of the traditional analog power supply system 100. On the secondary side 106 of the traditional analog power generator system 100, various components such as a rectifier 110, an error sensor 112, and a power supply output 122 are shown in FIG. 1. A power supply for CPU 120 within the traditional analog power supply system 100 is comprised of a transformer dividing the power from the primary side 104 from the secondary side 106 to eventually deliver power to the CPU 118. Finally, traditional analog power supply system 100 also contains a feedback loop 111 that reports the error at the power supply output 122 using an error sensor 112 and relays the error to an analog pulse width modulator (APWM) 116 on the primary side 104 through an isolation component 114.

It is worth noting that traditional analog power supply systems 100 are continuous, linear, and non-intelligent systems, and the analog pulse width modulator (APWM) 116 is used to control the pulse width and maintain the output voltage at power supply output 122. The analog pulse width modulator (APWM) 116 adjusts the pulse width based on the error detected by the error sensor 112 coming back from the feedback loop 111 when the output deviates from the desired output.

Traditional analog power supply system 100 does not adapt well to situations where the power supply output 122 needs to be changed. In order to change the power supply output 122, the entire analog power supply system 100 needs to be disconnected and various new parts needs to be installed before the traditional analog power supply system 100 can produce a different power supply output 122.

Figure 2:
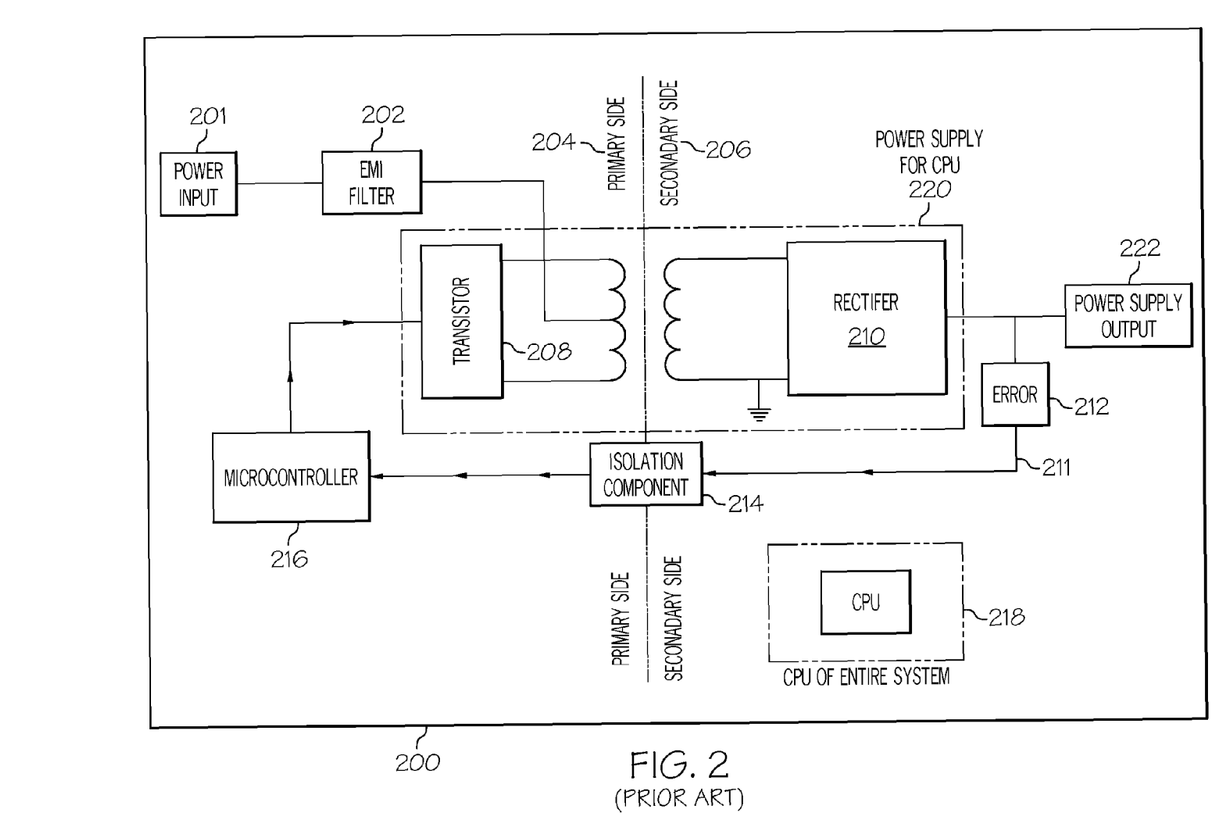
FIG. 2 shows a prior art digital power supply system.

Turning now to FIG. 2, which shows a digital power supply system 200 that address the deficiencies of an analog power supply system 100 as identified above in FIG. 1. A digital power supply system 200 utilizes a microprocessor 216 instead of an analog pulse width modulator (APWM) 116 (see FIG. 1) to provide a discontinuous and intelligent control that is capable of making adjustments to the power supply output 222 without changing physical components. However, in order to make adjustments to the microcontroller's 216 behavior, an operator still needs to physically access the microcontroller 216 in order to reprogram it.

FIG. 2 shows the digital power supply system 200 containing a primary side 204 and a secondary side 206. The primary side 204 contains a power input 201, an electromagnetic interference (EMI) filter 202, a transistor 208, and the microcontroller 216 mentioned above. The microprocessor 216 in this prior art embodiment is used to control the pulse width associated with error adjustment instead of using the analog pulse width modulator (APWM) 116 (see FIG. 1) as seen in analog power supply system 100 (See FIG. 1). The digital power supply system 200 also contains a secondary side 206 with a rectifier 210, an error sensor 212, a feedback loop 211, a central processing unit (CPU) system 218, and a power supply output 222. Finally, digital power supply system 200 also contains a feedback loop 211 that reports the error at the power supply output 222 using an error sensor 212 to the microcontroller 216 on the primary side 204 through an isolation component 214.

The microcontroller 216 in the digital power supply system 200 is capable of functioning like an analog pulse width modulator (APWM) in creating a pulse width to compensate for the error detected by error sensor 212. It is advantageous to use a microcontroller 216 instead of an analog pulse width modulator (APWM) 116 because a microcontroller 216 provides an intelligent, dynamic control over the output of the power supply 200. Moreover, a digital power supply 200 reduces the total part count and allows the power supply output 222 to be operated in the discontinuous mode.

However, although microcontroller 216 contains memory and a processor, the microcontroller 216 is independent apparatus deriving its power directly from the power input 201. Because of this, the microcontroller 216 needs to be reprogrammed for a new power supply output to be implemented; this requires a physical interaction with the microcontroller 216.

Hence, it can be seen that there is a need for an innovative modified pulse width modulator (MPWM) that can address the drawbacks of both the analog pulse width modulators (APWM) and the microprocessors in their inability to adjust the output needs remotely without having to physically replace components or reprogram the microcontroller 216.

SUMMARY OF THE INVENTION

In one aspect of the present invention, a power supply system comprises a power input providing an input to the power supply system, a power output providing an output from the power supply system, an error sensor connected to the power output, a central processing unit connected to the power output, wherein the central processing unit derives power directly from the power output; and a modified pulse width modulator connected to both the central processing unit and the error sensor, wherein the central processing unit (CPU) produces a command for the modified pulse width modulator to control the power output.

In another aspect of the invention, a power supply system comprises a power input providing an input to the power supply system, a power output providing an output from the power supply system, an error sensor connected to the power output, a central processing unit connected to the power output, wherein the central processing unit derives power directly from the power output; and a modified pulse width modulator connected to the central processing unit receiving a command from the central processing unit to control the power output; wherein the modified pulse width modulator further comprising of a variable frequency oscillator adapted to receive the command to adjust a clock signal, a duty cycle function adapted to receive the command to adjust a duty cycle, and an output stage adapted to receive the command to produce a modified pulse width modulator output; wherein the duty cycle function can utilize both an analog signal and a digital signal.

In a further aspect of the invention a power supply system comprises a power input providing an input to the power supply system, a power output connected to an outlet of the power supply system providing an output, an error sensor connected to the power output to determine an error in the output, a modified pulse width modulator connected to the error sensor to adjust a pulse of the modified pulse width modulator, and a central processing unit connected to the modified pulse width modulator providing an adjustment of the pulse of the modified pulse width modulator; wherein the central processing unit is powered by the power output.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can be used independently of one another or in combination with other features. However, any single inventive feature may not address any of the problems discussed above or may only address one of the problems discussed above. Further, on more of the problems discussed above may not be fully addressed by any of the features described below.

The present invention generally provides a modified pulse width modulator (MPWM) combined with hybrid power supply system may allow the operator to control the modified pulse width modulator (MPWM) remotely without having to physically access the power supply system itself. The current invention may connect the central processing unit (CPU) to the modified pulse width modulator (MPWM) to send a signal to the modified pulse width modulator (MPWM), allowing adjustments of the output voltage of the hybrid power supply. This invention is unlike the prior art where adjustments to the output of the power supply requires the operator to physically access the analog pulse width modulator (APWM) or the microcontroller to remove components or reprogram the microcontroller.

Figure 3:
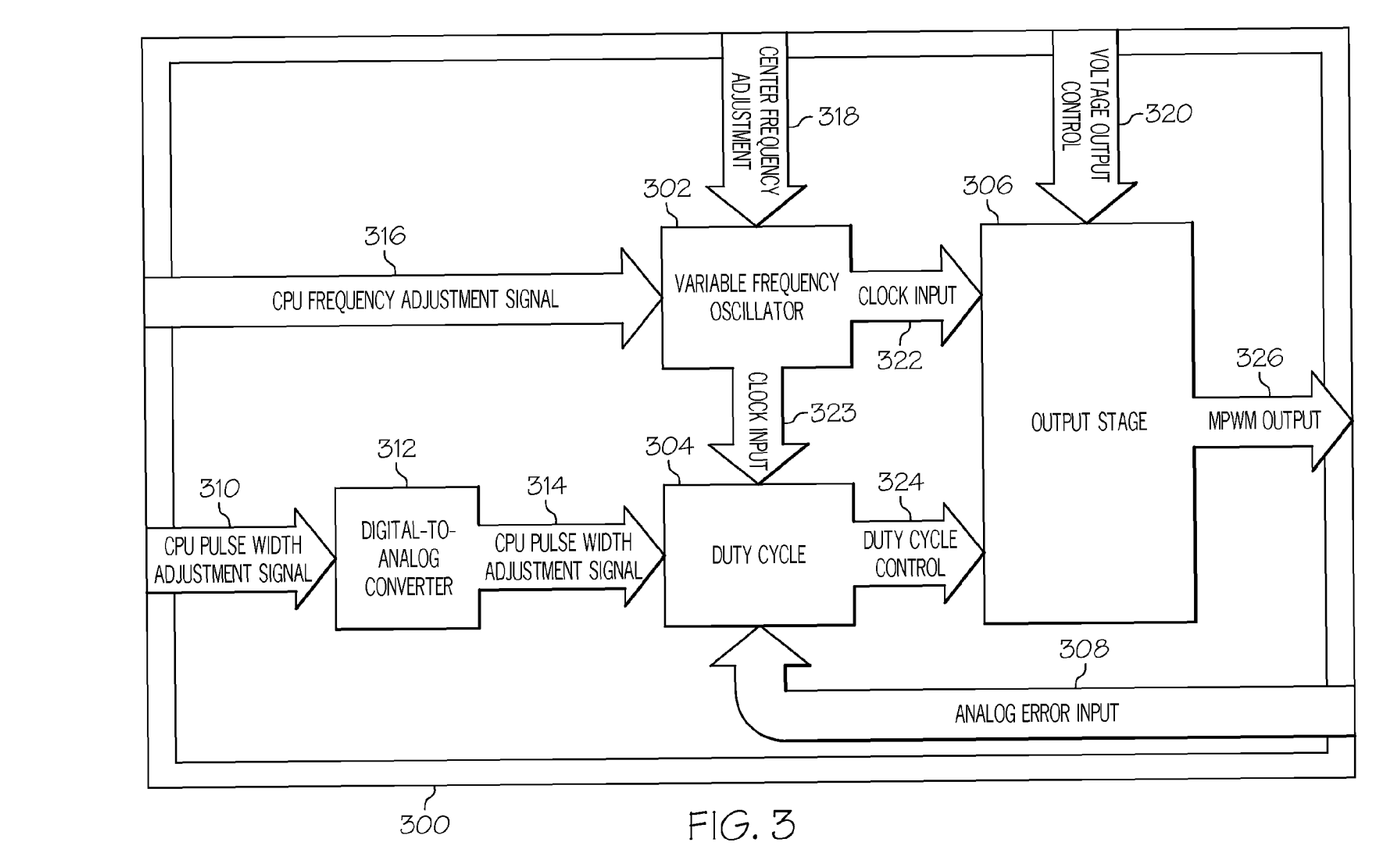
FIG. 3 shows a modified pulse width modulator in accordance with the present invention.

FIG. 3 shows the internal compositions of the modified pulse width modulator (MPWM) 300. Modified pulse width modulator (MPWM) 300, in this current exemplary embodiment, includes a variable frequency oscillator 302, a duty cycle function 304, and an output stage 306 to adjust the modified pulse width modulator (MPWM) output 326 by controlling a magnitude, a frequency, or a period of the modified pulse width modulator's output signal.

The variable frequency oscillator 302 in this current exemplary embodiment may be used to control the frequency of the modified pulse width modulator (MPWM) output 326 via a clock input 322 and 323. The frequency adjustment initially may derive from a center frequency adjustment 318 or from a CPU frequency adjustment signal 316. The center frequency adjustment 318 may generally be a hard adjustment utilizing physical components that can be used to determine the initial frequency output of the modified pulse width modulator (MPWM) 300 before the CPU has been initialized at start-up. The CPU frequency adjustment signal 316 on the other hand may provide a digital command to alter the frequency output above or below the center frequency originally indicated by center frequency adjustment 318 to make further adjustments as they are needed.

The duty cycle function 304 in this current exemplary embodiment may be used to control the modified pulse width modulator's (MPWM) 300 output period via a duty cycle control 324. The duty cycle function 304 may receive an analog error input 308 from an analog sensor (not shown) connected to the output of the power supply (not shown) to alter the pulse width of the modified pulse width modulators output signal. The analog error input 308 may be biased by a central processing unit (CPU) (not shown) to fine tune the desired pulse width by adjusting the built in reference voltage. This adjustment may come from the CPU pulse width adjustment signal 310, and may need to pass through a digital-to-analog converter 312 if the output is not already in an analog format.

Finally, the output stage 306 in the current exemplary embodiment may receive the clock input 322 from the variable frequency oscillator 302 or a duty cycle control 324 from the duty cycle function 304 to adjust the modified pulse width modulator (MPWM) output 326. Output stage 306 may be used as an additional source of control of the modified pulse width modulator (MPWM) output 326 independent of the frequency or the duty cycle by adjusting the magnitude of the output signal via voltage output control 320. This voltage output control 320 is a function that may also be controlled by the central processing unit (CPU).

Figure 4:
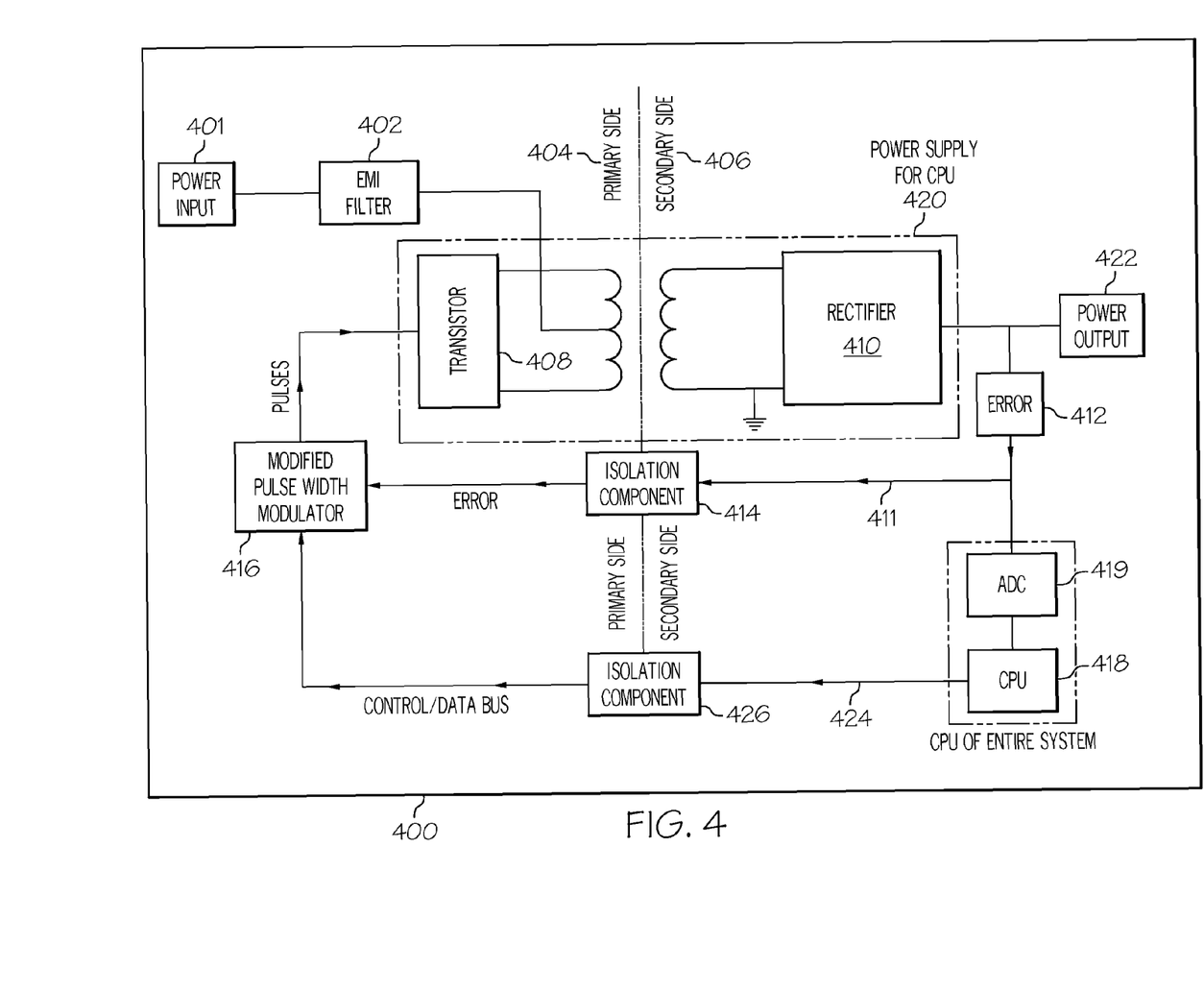
FIG. 4 shows a hybrid power supply control system in accordance with the present invention.

FIG. 4 shows a hybrid power supply system 400 utilizing a modified pulse width modulator (MPWM) 416 instead of an analog pulse width modulator or a microcontroller.

Hybrid power supply system 400 in this current exemplary embodiment as shown in FIG. 4 may contain a primary side 404 from which a power input 401 may be connected, and a secondary side 406 from a power output 422 and all the systems electrical components may be connected to. Primary side 404 may consist of essential components such as the power input 401, an electromagnetic interference (EMI) filter 402, a transistor 408, and most importantly a modified pulse width modulator (MPWM) 416. On the opposite secondary side 406, shielded from the power input 401 may be a rectifier 410, an error sensor 412, and a power output 422. A power supply for CPU 420 may span across the primary side 404 and the secondary side 406, and may be further comprised of a transformer that controls the transfer of electricity from the primary side 404 to the secondary side 406. FIG. 4 also demonstrates how the output coming from the error sensor 412 may be passed to a central processing unit (CPU) 418 via an analog to digital converter (ADC) 419.

It is worth noting that in this current exemplary embodiment of the hybrid power supply system 400, two feedback loops may be created. First, an analog feedback loop 411 may function to control the output with respect to the error via an isolation component 414. Secondly, a control feedback loop 424, on the other hand, may function to send multiple adjustment signals to the modified pulse width modulator (MPWM) 416. These adjustment signals may comprise of a frequency adjustment signal 316 (as shown in FIG. 3) that serves to adjust the power output 422, a voltage output control signal 320 (as shown in FIG. 3) that also serves to adjust the power output 422, a pulse width adjustment signal 310 (as shown in FIG. 3) that serves to fine tune the analog error input, or any other signal that may be relevant to the operation of a power supply system without departing from the scope of the present invention.

First and foremost, the power input 401 in the current exemplary embodiment may be connected externally to a power source, and provides power to the hybrid power supply system 400. Hybrid power supply system 400 in the current embodiment may be used to produce electrical power at a desired voltage. However, in order to maintain the correct power output 422 voltage, a predetermined reference voltage may be used, and that value may be compared with the actual output, using the error sensor 412 to make adjustments.

In the current exemplary embodiment, the power input 401 may pass through an electromagnetic interference (EMI) filter 402, which may eliminate the noise stemming from electromagnetic radiation. Although the electromagnetic interference (EMI) filter 402 is generally used in the hybrid power supply system 400, other types of filters that is capable of eliminating noise can also be used without departing from the scope of the present invention.

The division between primary side 404 and secondary side 406 of the current exemplary embodiment may illustrate a common separation of power supply systems, from which the sensitive electrical components may be protected from unstable power input 401 by utilizing a transformer between the primary side 404 from the secondary side 406.

Transistor 408 in the current exemplary embodiment may be located on the primary side 404, connected to the output of the electromagnetic interference (EMI) filter 402. Transistor 408 in this current exemplary embodiment may be a field effect transistor; however numerous other transistors such as a bipolar junction transistor or any other transistor that is capable of amplifying or switching the electrical signal may be used without departing from the scope of the present invention. Transistor 408 may also contain a power driver to maintain the pulses coming from modified pulse width modulator (MPWM) 416 in conjunction with the field effect transistor without departing from the scope of the present invention.

Rectifier 410 may be connected to the secondary side 406 of the hybrid power supply system 400, and may be used to convert alternating current into a direct current that is more suitable for usage by the various electrical components that are connected to the hybrid power supply system 400. In addition, rectifier 410 may include additional capacitors that serve to store electrical charge within rectifier 410 to complement rectifier 410 without departing from the scope of the present invention.

It is worth noting that in the current exemplary embodiment, the transistor 408 and the rectifier 410 may be connected to each other via a transformer forming a power supply to the central processing unit (CPU) 420 as illustrated in FIG. 4.

Error sensor 412 in the current exemplary embodiment may be used to determine the difference in power output 422 from a predetermined desired output. The error sensor 412 then may send the error to the modified pulse width modulator (MPWM) 416 directly via feedback loop 411 to make adjustments to power output 422.

Error from the error sensor 412 may pass through either the analog feedback loop 411 directly to the modified pulse width modulator (MPWM) 416, or through the control feedback loop 424, after first passing through the central processing unit (CPU) 418. This dual path setup may allow the error to be relayed to the modified pulse width modulator (MPWM) 416 via the control feedback loop 424 under normal operations, while allowing the error to be relayed via the analog feedback loop 411 in the event the central processing unit (CPU) 418 does not have sufficient power during start up.

Control feedback loop 424, in this current exemplary embodiment may also be used to relay numerous signals from the central processing unit (CPU) 424 to modified pulse width modulator (MPWM) 416 in order to control the power output 422. First and foremost, control feedback loop 424 may be used to relay the CPU frequency adjustment signal 316 (as shown in FIG. 3) to the modified pulse width modulator (MPWM) 416 to adjust the frequency of the output. Additionally, control feedback loop 424 may also be used to relay the CPU pulse width adjustment signal 310 (as shown in FIG. 3) to fine tune the desired pulse width by adjusting the built-in reference voltage that the analog error input 308 (as shown in FIG. 3) is compared to. Finally, control feedback loop 424 may also be used to relay the voltage output control 320 (as shown in FIG. 3) to control the magnitude of the output.

It is worth noting that in this current exemplary embodiment, the central processing unit (CPU) 418 may not have any source of power during start up of the hybrid power supply system 400, thus the error from error sensor 412 may not be processed by the central processing unit (CPU) 418 during start up. Consequently, the hybrid power supply system 400 may need to derive the error directly via the analog feedback loop 411 to the modified pulse width modulator (MPWM) 416 until the system starts and can provide sufficient power to the central processing unit (CPU) 418.

Isolation components 414 and 426 in this current exemplary embodiment may be located in the feedback loops 411 and 424, and they may serve to maintain the isolation of the error output from the error sensor 412 to be relayed back to the modified pulse width modulator (MPWM) 416. In this current exemplary embodiment, isolation components may comprise of optocouplers; however various other components that are capable keeping the signal isolated may also be used without departing from the scope of the present invention.

Modified pulse width modulator (MPWM) 416 may receive error data from either an analog feedback loop 411, a central processing unit (CPU) 418, or one of the several control commands from control feedback loop 424. Upon receipt of the error command from error sensor 412, the modified pulse width modulator (MPWM) 416 may send a pulse train to the transistor 408 to adjust the induced power from the primary side 404 to the secondary side 406 to be in conformity with the predetermined output. Modified pulse width modulator (MPWM) 416, in this current exemplary embodiment may also be capable of receiving one of several control command from the central processing unit (CPU) 418 to adjust the reference output of the hybrid power supply system 400 all without the need to disconnect the entire hybrid power supply system 400 from its physical architecture.

Central processing unit (CPU) 418 of the current exemplary embodiment may be connected to receive an error from error sensor 412 after the signal has passed through an analog to digital converter (ADC) 419. However, the analog digital converter (ADC) 419 is not necessary if a digital error sensor 412 is used, producing an output that is already in a digital format without deviating from the scope of the present invention. Central processing unit (CPU) 418 in this current exemplary embodiment may contain a processor and a memory to help execute high level commands such as setting program interrupts to maintain the desired power supply output or switching the output mode from continuous to discontinuous mode. In order to control the power output 422 of hybrid power supply system 400, central processing unit (CPU) 418 in this current exemplary embodiment may often change important variables such as a frequency, magnitude, or period; however, various other could also be used without departing from the scope of the present invention.

Power supply for central processing unit (CPU) 420 in this current exemplary embodiment may contain transistor 408 and rectifier 410 by connecting them in conjunction with a transformer to provide power to the central processing unit (CPU) 418.

Finally, power output 422 in the current exemplary embodiment may be used to supply power to various electrical components that can be connected to the hybrid power supply system 400. However, it is worth noting that the power output 422 of the hybrid power supply system 400 can be used to provide power to the same central processing unit (CPU) 418 that is used to control and regulate itself. This inherently counterintuitive power and control set up is achieved by incorporating the advantages of both an analog power supply and a digital power supply to create a hybrid power supply system 400, utilizing a modified pulse width modulator (MPWM) 416 to regulate the power output 422

Hybrid power supply system 400, although deriving power and control from central processing unit (CPU) 418, may also function during a start-up state when the hybrid power supply system 400 has yet to generate a power output 422 to power the central processing unit (CPU) 418. Hybrid power supply system 400 may take advantage of feedback loop 411, which is not dependent upon a command from a central processing unit (CPU) 418 to provide the necessary feedback. When the central processing unit (CPU) 418 does not have sufficient power to give a control command, the modified pulse width modulator (MPWM) 416 may utilize an internal reference similar to center frequency adjustment 318 to provide the appropriate reference during such a start-up stage, allowing for continuous operation.

Figure 5:
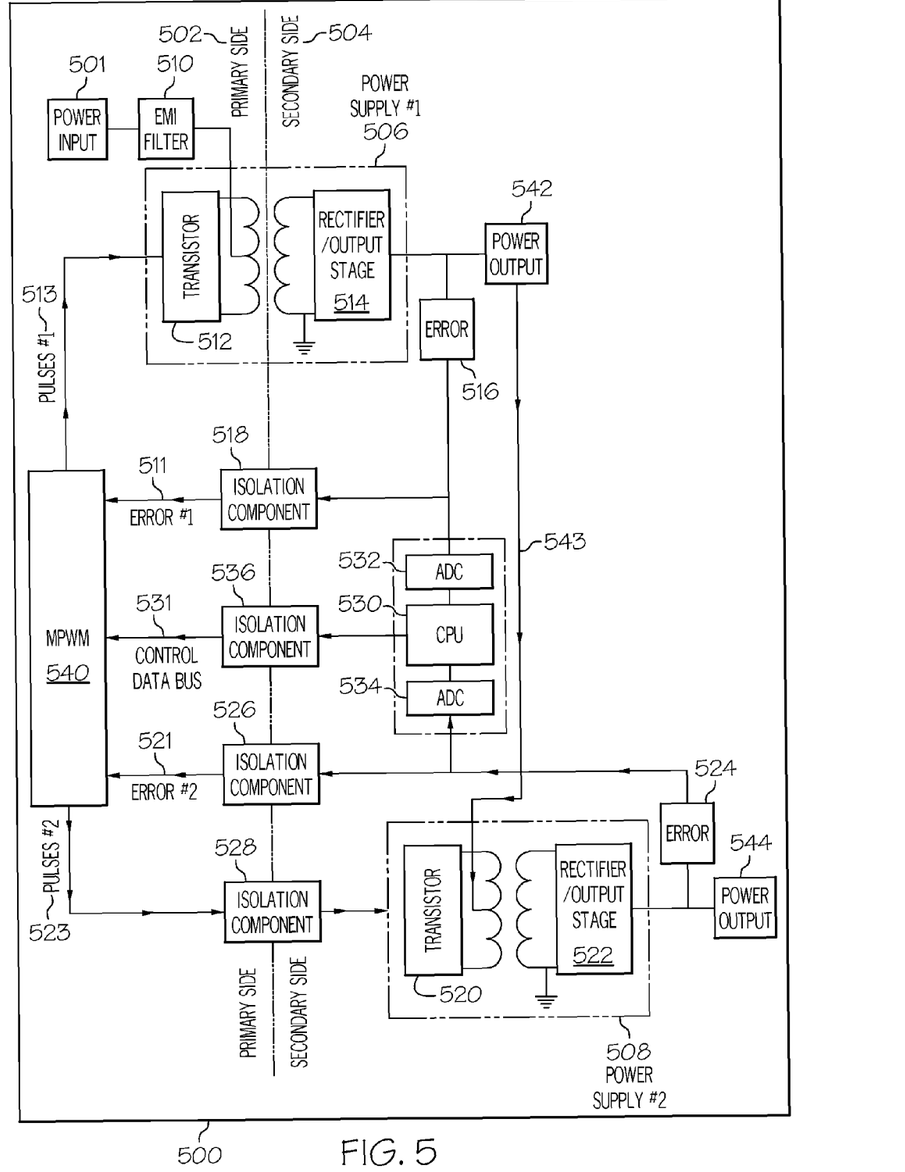
FIG. 5 shows a multi-level power supply control system utilizing the modified pulse width modulator in accordance with the present invention.

Turning now to FIG. 5, which shows an alternative embodiment of the current invention wherein a dual hybrid power supply system 500 may be used to control two power supplies; power supply #1 506 as well as a power supply #2 508.

Notice in FIG. 5, the various components from hybrid power supply system 400 are carried over into dual hybrid power supply system 500. In addition, FIG. 5 shows an alternative embodiment where a singular central processing unit (CPU) 530 may be used to control one modified pulse width modulator (MPWM) 540, which in turn may be used to control both power supply #1 506 as well as power supply #2 508. Here, in this alternative embodiment, power supply #1 506 may function similar to the previously disclosed hybrid power supply system 400, however it is worth noting that the power output 542 of power supply #1 506 may be used to provide a power input 543 to power supply #2 508. As a result of the connection, power supply #2 508 no longer requires an electromagnetic interference (EMI) filter 510.

Due to the advanced processing capabilities of a central processing unit (CPU) 530, a singular central processing unit (CPU) 530 may be used control multiple power supplies as shown in FIG. 5. This alternative embodiment of dual hybrid power supply system 500 is advantageous because of its ability to reduce duplicative microcontrollers or analog pulse width modulator components originally needed to control each power supply unit.

It is also worth nothing that in this current exemplary embodiment, one modified pulse width modulator (MPWM) may be used to control a single power supply as shown in FIG. 4, two power supplies as shown in FIG. 5, or any number of power supplies without departing from the scope of the present invention, so long as it utilizes a central processing unit (CPU) and a modified pulse width modulator (MPWM).

It should be understood, of course, that the foregoing relates to exemplary embodiments of the invention and that modifications may be made without departing from the spirit and scope of the invention as set forth in the following claims.

I claim:

1. A power supply system comprising:
   a power input providing an input to said power supply system;
   a power output providing an output from said power supply system;
   an error sensor connected to said power output;
   a modified pulse width modulator;
   a central processing unit connected to provide frequency adjustment signals and pulse width adjustment signals to the modified pulse width modulator; and
   the modified pulse width modulator comprising:
      a variable frequency oscillator connected to receive said frequency adjustment signals;
      a duty cycle function generator connected to receive said pulse width adjustment signals,
      an output stage connected to the variable frequency oscillator and the duty cycle function generator to receive a clock input from the variable frequency oscillator and a duty cycle signal from the duty cycle function generator and to vary output voltage,
      the output stage being connected to the power output.

2. The power supply system of claim 1, further comprising:
   an analog feedback loop connecting said error sensor and said modified pulse width modulator; and
   a control feedback loop connecting said central processing unit and said modified pulse width modulator.

3. The power supply system of claim 1, wherein said analog feedback loop sends an analog error input to said modified pulse width modulator.

4. The power supply system of claim 1, wherein said command contains a voltage output control signal sent to said modified pulse width modulator.

5. The power supply system of claim 1, wherein said variable frequency oscillator receives a center frequency adjustment to determine said clock input during a start up cycle when said central processing unit does not have sufficient power.

6. The power supply system of claim 3, wherein said pulse width adjustment signal fine tunes said analog error input by adjusting a built-in reference voltage within said modified pulse width modulator.

7. A power supply system comprising:
   a power input providing an input to said power supply system;
   a power output providing an output from said power supply system;
   an error sensor connected to said power output;
   a central processing unit connected to said power output, wherein said central processing unit derives power directly from said power output; and
   a modified pulse width modulator connected to said central processing unit receiving a command from said central processing unit to control said power output;
   wherein said modified pulse width modulator further comprises:
      a variable frequency oscillator connected to receive said command;

a duty cycle function generator connected to receive said command, and an output stage connected to receive a clock input from the variable frequency oscillator, a duty cycle signal from the duty cycle function generator and a voltage output control from the central processing unit to vary output voltage;

wherein the output stage is connected to the power output and wherein said duty cycle function generator is connected to receive both an analog signal and a digital signal.

8. The power supply system of claim 7, further comprising:

an analog feedback loop connecting said error sensor and said modified pulse width modulator; and a control feedback loop connecting said central processing unit and said modified pulse width modulator;

wherein said control feedback loop relays said command from said central processing unit to said modified pulse width modulator.

9. The power supply system of claim 8, wherein said control feedback loop does not relay said command during a start up cycle when said central processing unit does not have sufficient power.

10. The power supply system of claim 9, wherein said analog feedback loop sends an analog error input to said modified pulse width modulator.

11. The power supply system of claim 10, wherein said command contains a frequency adjustment signal sent to said modified pulse width modulator.

12. The power supply system of claim 11, wherein said command contains a pulse width adjustment signal sent to said modified pulse width modulator.

* * * * *